United States Patent [19]

Willmann

[11] Patent Number: 5,044,700
[45] Date of Patent: Sep. 3, 1991

[54] SYSTEM AND METHOD FOR REGULATING A BRAKE PRESSURE IN A BRAKE CHAMBER

[75] Inventor: Karl-Heinz Willmann, Freiberg, Fed. Rep. of Germany

[73] Assignee: Robert Bosch GmbH, Stuttgart, Fed. Rep. of Germany

[21] Appl. No.: 542,122

[22] Filed: Jun. 22, 1990

[30] Foreign Application Priority Data

Aug. 3, 1989 [DE] Fed. Rep. of Germany ....... 3925649

[51] Int. Cl.[5] .......................... B60T 8/32; B60T 8/36; B60T 13/68
[52] U.S. Cl. .................................. 303/100; 188/358; 303/110; 303/114; 303/119
[58] Field of Search ............... 303/119, 114, 116, 110, 303/100, DIGS. 3-4, 50, 52, 56, 15, 93; 188/358, 359; 60/545, 555, 547.1, 550, 552, 554; 180/197

[56] References Cited

U.S. PATENT DOCUMENTS

| 4,568,130 | 2/1986 | Leiber | 303/114 X |
| 4,660,897 | 4/1987 | Leiber | 303/114 |
| 4,662,687 | 5/1987 | Leiber | 303/114 X |
| 4,678,243 | 7/1987 | Leiber | 303/114 X |
| 4,832,417 | 5/1989 | Kehl | 303/114 |
| 4,919,493 | 4/1990 | Leiber | 303/15 |

Primary Examiner—Douglas C. Butler
Attorney, Agent, or Firm—Edwin E. Greigg; Ronald E. Greigg

[57] ABSTRACT

A system and method for regulating a brake pressure in a brake chamber by a master brake cylinder piston, this master brake cylinder piston is associated with a brake pedal and piston rod that are acted upon by a braking force. When the brake pedal is actuated with a braking force, the master brake cylinder piston is simultaneously placed under pressure as a function of the pedal travel, and covers a longer travel than the brake pedal and piston rod.

18 Claims, 1 Drawing Sheet

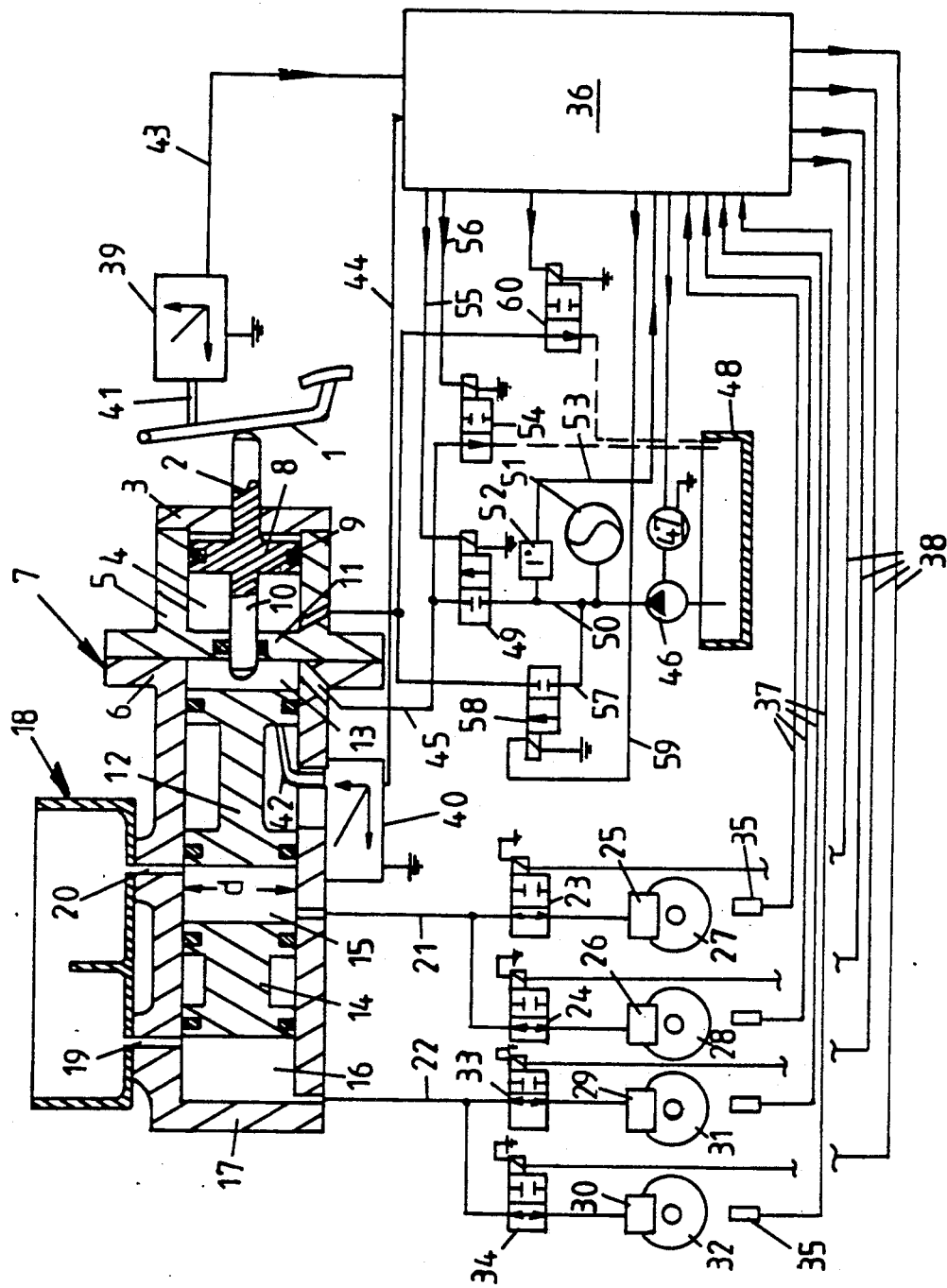

SYSTEM AND METHOD FOR REGULATING A BRAKE PRESSURE IN A BRAKE CHAMBER

BACKGROUND OF THE INVENTION

The invention relates to a system and method for regulating a brake pressure for the brakes of a vehicle.

A method of this kind is known for instance from U.S. Pat. No. 4,660,897. In the brake system shown there, both anti-skid control and traction control can be accomplished. The master brake cylinder piston cooperates directly with the pedal or piston rod acted upon by the brake pedal, and a device for regulating the servo or power braking force is provided between the brake pedal and the master brake cylinder piston.

In these known methods and brake systems, it has proved to be disadvantageous that the pressure upon the master brake cylinder piston is effected solely by the piston rod. Particularly when a servo or power brake booster is also incorporated between the pedal and the master brake cylinder piston, then in the event that the brake booster should fail, markedly increased pedal pressure must be exerted to attain the same braking action.

OBJECT AND SUMMARY OF THE INVENTION

The present invention has a substantial advantage that the imposition of braking force upon the master brake cylinder piston is no longer effected exclusively by the pedal rod or piston rod disposed between the brake pedal and the master brake cylinder. According to the invention, the master brake cylinder piston, when acted upon by a braking force from the brake pedal, is placed under pressure in accordance with the brake pedal travel, and according to the invention it then covers a longer travel path than does the pedal rod or piston rod actuated by a braking force directly via the brake pedal.

In other words, in the present case the braking force upon the brake pedal does not act upon the master brake cylinder piston directly via the pedal rod or piston rod; instead, a pressure is built up in accordance with the pedal travel in a pressure chamber upstream of the master brake cylinder, and the pressure of this chamber is likewise determined by the pedal travel or by the brake force on the pedal. However, this is achieved via a pressure buildup controlled by a control unit. This is highly advantageous, especially when a power brake booster is disposed between the brake pedal and the master brake cylinder; it provides for a jump in leverage if the servo power, i.e., the power brake, should fail. That is, if the power brake fails, a shorter master brake cylinder piston travel is associated with the pedal travel than in the case of servo, or power assisted operation; or to put it another way, in the event of power brake failure, brake pressure on the applicable wheel brake cylinder that is as high as before can be attained with a relatively slight pedal force.

To better regulate the pressure buildup upstream of the master brake cylinder piston, it is desirable to detect both the pedal travel and the travel of the master brake cylinder piston. These actual values are then compared with a control unit with set-point values, so that the further travel that the master brake cylinder piston must complete can be detected and controlled accurately.

In a brake system using the method, at least one master brake cylinder piston and one brake chamber for exerting braking pressure on wheel brake cylinders should be provided in a master brake cylinder, with corresponding intervening valves that are necessary for anti-skid control in particular; the brake pressure from a brake pedal acts upon a pedal rod or piston rod. According to the invention, the master brake cylinder piston is preceded by a pressure chamber, which via a line communicates with a supply container for pressure fluid. A pump, operated for instance by a suitable electric motor, is preferably used to feed this pressure fluid into the pressure chamber upstream of the master brake cylinder piston. Valves are also provided that assure control of the inflow and return flow of the pressure fluid. Triggering of the valves is effected via the aforementioned control unit.

The invention will be better understood and further objects and advantages thereof will become more apparent from the ensuing detailed description of a preferred embodiment taken in conjunction with the drawing.

BRIEF DESCRIPTION OF THE DRAWING

The single FIGURE of the drawing is a block diagram of a brake system, with a master brake cylinder shown schematically in longitudinal section.

DESCRIPTION OF THE PREFERRED EMBODIMENT

Via a brake pedal 1, a pedal rod 2 can be acted upon with braking force. This pedal rod 2 extends through a lid 3 that closes a power brake chamber 4. The power brake chamber 4 is embodied by a housing part 5 that is flanged to a main housing part 6 of the master brake cylinder 7.

A power brake piston 8 slides by the force of the pedal rod 2 in the power brake chamber 4 and is supported against the inner wall of the power brake chamber 4 via a corresponding ring seal 9. On the other end of the pedal rod 2, the power brake piston 8 continues in the form of a further piston rod 10, which extends through a bottom 11 of the housing part 5 or power brake chamber 4 and penetrates the main housing part 6. There, a first master brake cylinder piston 12 is associated with this piston rod 10, but not connected to it. This first master brake cylinder piston 12, with the bottom 11, forms a pressure chamber 13 and, with a second master brake cylinder piston 14, forms a first brake chamber 15. The second master brake cylinder piston 14 is then adjoined by the second brake chamber 16, which is closed off by a bottom 17 of the master brake cylinder 7 or main housing part 6.

Further elements such as pressure springs for returning the first and second master brake cylinder pistons 12 and 14 and for connecting the two pistons are omitted, for the sake of simplicity in the drawing.

Brake fluid flows from a supply container 18 via suitable inlet bores 19 and 20 into the first and second brake chambers 15 and 16, respectively. Each brake chamber 15 and 16 is adjoined by a respective brake line 21 and 22; via magnetic valves 23 and 24, the brake line 21 supplies brake fluid to wheel brake cylinders 25 and 26 of wheels 27 and 28, which are only schematically shown.

Similarly, wheel brake cylinders 29 and 30 for wheels 31 and 32, respectively, communicate with the second brake chamber 16 via corresponding magnetic valves 33 and 34 and the brake line 22.

The activity of the wheels 27, 28, 31 and 32 is monitored by wheel sensors 35; each wheel sensor 35 is connected separately to a control unit 36 via a separate line 37. This control unit 36 also takes on the task of triggering the magnetic valves 23, 24, 33 and 34 via separate corresponding lines 38. One essential task of the magnetic valves 23, 24, 33 and 34 is anti-skid control, if wheel locking is detected by the wheel sensors 35; if wheel locking occurs, the appropriate magnetic valve 23, 24, 33, 34 can be switched to its closing position via the control unit 36. Such control is well known in the art and is therefore not described in further detail here.

Both the brake pedal 1 and the first master brake cylinder piston 12 are each assigned a respective travel sensor 39 and 40. Via suitable feelers 41 and 42, these travel sensors 39 and 40 detect the travel that the brake pedal 1 and first master brake cylinder piston 12, respectively, perform. This travel is then reported to the control unit 36 via corresponding connections 43 and 44.

The above-mentioned pressure chamber 13 between the first master brake cylinder piston 12 and the bottom 11 of the housing part 5 can be subjected to pressure fluid via a supply line 45. This is done via a pump 46 that is driven by a motor 47. In this process the pump 46 draws pressure fluid from a supply container 48 and carries it, after the switchover of a magnetic valve 49, into the pressure chamber 13. Also incorporated into the line 50 between the pump 46 and the magnetic valve 49 are a reservoir 51 and a pressure limiting valve 52 that communicates with the control unit 36 via a line 53. The return of the pressure fluid from the pressure chamber 13 via the supply line 45 is effected into the supply container 48 via a further magnetic valve 54. The two magnetic valves 49 and 54 communicate with the control unit 36 via corresponding connections 55 and 56.

Upon actuation of the brake pedal 1, pressure fluid is fed into the pressure chamber 13 via the supply line 45 by the opening of the magnetic valve 49 and the closure of the magnetic valve 54. As a result, a motion of the first master brake cylinder piston 12 takes place separately from an imposition of pressure by the piston rod 10, until such time as the set-point travel desired by the control unit 36 is attained. This is done by comparison of the values that are obtained from the travel sensors 39 and 40.

The set-point travel of the first master brake cylinder piston 12 is greater than the travel of the pedal rod 2; as a result, the required volume of brake fluid can be positively displaced with a relatively small diameter d of the master brake cylinder 7. As a result, a jump in leverage in the event of power brake failure is attained, because in such power brake failure a shorter path of the first master brake cylinder piston 12 is associated with the pedal travel than in power assisted operation. This means that in power brake failure, a high pressure can be generated in the brake chambers 15 and 16 with less pedal force.

Furthermore, a branch 57 is provided from the line 50 between the pump 46 and the magnetic valve 49; this branch forms a connection for the pressure medium from the supply container 48 to the power brake chamber 4. A further magnetic valve 58 is incorporated into this branch 57 and communicates via a control line 59 with the control unit 36. Once again, the return of the pressure fluid takes place into the supply container 48 via a further magnetic valve 60.

If an anti-skid control situation arises, the magnetic valve 60 is closed and as a result the brake pedal 1 is arrested, because neither an inflow nor an outflow of pressure fluid from the power brake chamber 4 can take place. Contrarily, via the magnetic valves 49 and 54, modulation of the pressure in the pressure chamber 13 takes place, and with the aid of the known hydraulic multiplexing process the pressure in the wheel brake cylinders 25, 26, 29 and 30 can be modulated as well, via the magnetic valves 23, 24, 33 and 34. In this pressure modulation, if the first master brake cylinder piston 12 strikes the piston rod 10, then the brake pedal 1 is pushed back via the pedal rod 2 or power brake piston 8 by opening of the magnetic valve 58, so as thus to enable a longer return travel of the first master brake cylinder piston 12. As a result, a full reduction of brake pressure from the wheel brake cylinders 25, 26, 29 or 30 is attained.

If the situation of traction control should arise, then the magnetic valves 33, 34 or 23, 24 of the non-driven wheels are closed, and the brake pressure is modulated by a buildup or reduction of pressure in the pressure chamber 13 via the magnetic valves 49 or 54. Modulating the brake pressure directly at the wheels is effected again via the corresponding magnetic valves with the aid of the hydraulic multiplexing process.

The operation of the system is as follows:

If the brake pedal 1 is acted upon with brake force, the travel sensor 39 detects this motion of the brake pedal and passes it on to the control unit 36. At the same time, the valve 49 between the pump and the pressure chamber 13 upstream of the master brake cylinder piston 12 is switched open, and the master brake cylinder piston is placed under braking pressure by the pressure fluid in the pressure chamber 13. The travel of the master brake cylinder piston is detected by the travel sensor 40 associated with it, which feeds the values back to the control unit 36. The corresponding values of the travel sensors are compared with one another there, and the desired set-point travel of the master brake cylinder piston 12 is thus adjusted precisely.

If the power brake booster, for instance, should fail, then as a result of this electronically controlled brake boosting directly upon the master brake cylinder piston, a jump in leverage is possible without needing extra equipment. Very simple modulation, of both an anti-skid control means and a traction control means also becomes possible, at no additional expense. In order not to impede this modulation if an anti-skid control situation arises, it is provided that the pedal rod 2 or piston rod 10 is arrested, so that any further attempt at increasing the braking pressure via the brake pedal remains ineffective. For the sake of simplicity, this is done by blocking the inflow or outflow of pressure fluid to a corresponding power assist chamber 4 that has a power brake piston 10 connected to the pedal rod 2 or piston rod sliding in it. In the case of anti-skid control, this power assist chamber 4 is placed under pressure via the applicable valve 57, thus returning the brake pedal to its original position. The pressure chamber 13 upstream of the master brake cylinder piston can be relieved at the same time, and the master brake cylinder piston 12 thereby returned, by switching over the applicable valve 54. The modulation of the corresponding brake pressure directly at the wheel brake cylinders is then effected by means of the valves 23, 24, 29 or 30 preceding the wheel brake cylinders, by the process known as hydraulic multiplexing.

In the case of traction control, the Valves of the wheel brake cylinders of the non-driven wheels are closed, and the pressure in the pressure chamber upstream of the master brake cylinder piston is modulated. The regulation of the pressure in the wheel brake cylinders of the driven wheels is then effected, again with the aid of the hydraulic multiplexing process.

In particular, the relatively simple design of the entire brake system assures safe operation, even if individual portions should fail.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A hydraulic brake system having wheel brake cylinders (25, 26, 29, 30) for braking driven and non-driven wheels (27, 28, 31, 32), a master brake cylinder (7) which supplies the wheel brake cylinders with brake pressures, said master brake cylinder having a housing part (6) and at least one first master brake cylinder piston (12) displaceable in said master cylinder, a brake pedal (1) and a pedal rod (2) which activates a piston rod (10) movable toward said first master brake cylinder piston (12) for activating said first master brake cylinder piston (12), a hydraulic brake booster having a pressure chamber (13) in said master cylinder, said pressure chamber is supplied from a servo pressure source (46, 51) by which the master cylinder piston (12) is displaceable, said piston rod (10) passes into said pressure chamber (13) in a sealed and displaceable manner for mechanically displacing said first master brake cylinder piston (12), a control unit (36), said first travel sensor (39) operative by said brake pedal to send a control signal to said control unit (36) for operation of a booster valve assembly (49, 54) controllable by moving the brake pedal (1), said booster valve assembly is disposed between the servo pressure source (46, 51) and the pressure chamber (13) and between said pressure chamber (13) and a supply container (48), said booster valve assembly (49, 54) is embodied as an electrically controllable magnet valve assembly and is controllable by said control unit (36), a second travel sensor (40) is operative by said first master brake cylinder piston (12) and is electrically connected to the control unit (36), first travel sensor (39) is arranged for outputting electrical signal values that are in a first preselected ratio to displacement travel distances of the pedal rod (2); said second travel sensor (40) is arranged for outputting electrical signal values that are in a second preselected ratio to displacement travel distances of said first master brake cylinder piston (12), said first and second preselected ratios are adapted to one another in such a way that if the values from both travel sensors (39, 40) are equally large, the displacement travel of the master brake cylinder piston (12), is intentionally longer than an associated displacement travel of the pedal rod (2), and the booster valve assembly (49, 54) is controllable via the control unit (36) as a function of a comparison of the first and second values in such a manner that a value from the first travel sensor that varies upon displacement of the pedal rod (2) leads to an approximation of the part of the value from the second travel sensor (40), to the first value from the first travel sensor (39), via displacement of the master brake cylinder piston (12) by imposition of pressure from the servo pressure source (46, 51) via said booster valve assembly (49, 54).

2. The apparatus as defined by claim 1, in which wheel sensors (35) are associated with at least said driven wheels, said wheel sensors (35) are electrically connected to the control unit (36) so that said control unit (36) detects undesirably increasing drive slip and thereby controls the magnet valve assembly (49, 54) for an automatic hydraulic displacement of the master brake cylinder piston (12), and magnet valves (23, 24, 33, 34) are disposed between the master brake cylinder (7) and the wheel brake cylinders (25, 26, 29, 30) and operative by said control unit (36) to keep the brake pressure generated by the displacement of the master brake cylinder piston (12) away from the wheel brake cylinders of any wheels not tending to spin.

3. The apparatus as defined by claim 2, in which a power brake piston (8) is displaceable relative to and sealed off from a power brake chamber disposed upstream of the pressure chamber (13), said power brake piston (8) is disposed between the pedal rod (2) and the piston (10), a second magnet valve assembly (58, 60) is additionally connected to the servo pressure source (46, 51) to connect the power brake chamber (4) with the servo pressure source (46, 51) and to said supply container (48), said control unit (36) is arranged to detect a danger of wheel locking on a basis of electrical signals received from the wheel sensors (35) and to block off the power brake chamber (4) relative to the supply container (48) by means of said second magnet valve assembly (58, 60) and to connect the pressure chamber (13) with the supply container (48) by means of the magnet valve assembly (49, 54) in order to reduce the brake pressure in chamber (13) of the master brake cylinder (7), and to control at least one of the magnet valves (23, 24, 33, 34) in such a way that brake pressure reductions have an effect only in a wheel brake cylinder for a wheel which is tending to lock within a first anti-skid mode stage, and that in a possibly necessary second anti-skid mode stage, the power brake chamber (4) and the power brake piston (8) are acted upon with pressure from the servo pressure source (46, 51) via said second magnet valve assembly to displace the piston rod (10) toward the brake pedal (1), so that for a greater brake pressure reduction, the master brake cylinder (12) can move farther toward a non-braking position.

4. A brake system as defined by claim 1, which includes a pump (46) which is incorporated into a supply line (45).

5. A brake system as defined by claim 4, which includes a motor (47) that drives said pump (46), and said booster valve assembly (49, 54) and the motor (47) of the pump (46) are triggerable by the control unit (36).

6. A brake system as defined by claim 5, which includes a reservoir (51) and a pressure limiting valve (52) connected with a line (50) between the pump (46) and a valve (49) of said booster valve assembly (49, 54).

7. A hydraulic brake system having wheel brake cylinders (25, 26, 29, 30) for braking driven and non-driven wheels (27, 28, 31, 32), a master brake cylinder (7) which supplies the wheel brake cylinders with brake pressures, said master brake cylinder having a housing part (6) and at least one first master brake cylinder piston (12) displaceable in said master cylinder, a brake pedal (1) and a pedal rod (2) which activates a piston rod (10) movable toward said first master brake cylinder piston (12) for activating said first master brake cylinder piston (12), a hydraulic brake booster having a pressure chamber (13) in said master cylinder, said pressure chamber is supplied from a servo pressure source (46, 51) by which the master cylinder piston (12) is displaceable, said piston rod (10) passes into said pressure chamber (13) in a sealed and displaceable manner for mechanically displacing said first master brake cylinder piston (12), a control unit (36), a first travel sensor (39) operative by said brake pedal to send a control signal to said control unit (36) for operation of a booster valve assembly (49, 54) controllable by moving the brake pedal (1), said booster valve assembly is disposed between the servo pressure source (46, 51) and the pressure chamber (13) and between said pressure chamber (13) and a supply container (48), said booster valve assembly (49, 54) is embodied as an electrically controllable magnet valve assembly and is controllable by said control unit (36), a second travel sensor (40) is operative by said first master brake cylinder piston (12) and is electrically connected to the control unit (36), said first travel sensor (39) and said second travel sensor (40) are arranged for outputting electrical signal values that are substantially proportional to displacement travel distances of the pedal rod (20) and the master brake cylinder piston (12) respectively, electrical signal values from at least one of said first and second travel sensors (39, 40) are converted substantially proportionally, in such a way that if the values to be compared are the same, the displacement travel of the master brake cylinder piston (12) is intentionally longer than that of the pedal rod (2), and that the booster valve assembly (49, 54) is controllable via the control unit (36) in such a manner that a comparison value from the first travel sensor (39) caused by displacement of the pedal rod (2) leads to an approximation of the comparison value resulting from the second travel sensor (40) by displacement of the master brake cylinder piston (12) by imposition of pressure from the servo pressure source (46, 51) via said booster valve assembly (49, 54).

8. The apparatus as defined by claim 7, in which wheel sensors (35) are associated with at least said driven wheels, said wheel sensors (35) are electrically connected to the control unit (36) so that said control unit (36) detects undesirably increasing drive slip and thereby controls the magnet valve assembly (49, 54) for an automatic hydraulic displacement of the master brake cylinder piston (12), and magnet valves (23, 24, 33, 34) are disposed between the master brake cylinder (7) and the wheel brake cylinders (25, 26, 29, 30) and operative by said control unit (36) to keep the brake pressure generated by the displacement of the master brake cylinder piston (12) away from the wheel brake cylinders of any wheels not tending to spin.

9. The apparatus as defined by claim 8, in which a power brake piston (8) is displaceable relative to and sealed off from a power brake chamber disposed upstream of the pressure chamber (13), said power brake piston (8) is disposed between the pedal rod (2) and the piston (10), a second magnet valve assembly (58, 60) is additionally connected to the servo pressure source (46, 51) to connect the power brake chamber (4) with the servo pressure source (46, 51) and to said supply container (48), said control unit (36) is arranged to detect a danger of wheel locking on a basis of electrical signals received from the wheel sensors (35) and to block off the power brake chamber (4) relative to the supply container (48) by means of said second magnet valve assembly (58, 60) and to connect the pressure chamber (13) with the supply container (48) by means of the magnet valve assembly (49, 54) in order to reduce the brake pressure in chamber (13) of the master brake cylinder (7), and to control at least one of the magnet valves (23, 24, 33, 34) in such a way that brake pressure reductions have an effect only in a wheel brake cylinder for a wheel which is tending to lock within a first anti-skid mode stage, and that in a possibly necessary second anti-skid mode stage, the power brake chamber (4) and the power brake piston (8) are acted upon with pressure from the servo pressure source (46, 51) via said second magnet valve assembly to displace the piston rod (10) toward the brake pedal (1), so that for a greater brake pressure reduction, the master brake cylinder (12) can move farther toward a non-braking position.

10. A brake system as defined by claim 7, which includes a pump (46) which is incorporated into a supply line (45).

11. A brake system as defined by claim 10, which includes a motor (47) that drives said pump (46), and said booster valve assembly (49, 54) and the motor (47) of the pump (46) are triggerable by the control unit (36).

12. A brake system as defined by claim 11, which includes a reservoir (51) and a pressure limiting valve (52) connected with a line (50) between the pump (46) and a valve (49) of said booster valve assembly (49, 54).

13. A method of regulating a hydraulic brake system having wheel brake cylinders (25, 26, 29, 30) for braking driven and non-driven wheels (27, 28, 31, 32), a master brake cylinder (7) which supplies the wheel brake cylinders with brake pressures, said master brake cylinder having a housing part (6) and at least one first master brake cylinder piston (12) displaceable in said master cylinder, the method comprising operating a brake pedal (1) and a pedal rod (2) to activate a piston rod (10) movable toward said first master brake cylinder piston (12) for activating said first master brake cylinder piston (12) and a hydraulic brake booster having a pressure chamber (13) in said master cylinder, supplying fluid to said pressure chamber from a servo pressure source (46, 51) by which the master cylinder piston (12) is displaceable and by which said piston rod (10) passes into said pressure chamber (13) in a sealed and displaceable manner for mechanically displacing said first master brake cylinder piston (12), activating a control unit (36), operating a first travel sensor (39) by operation of said brake pedal to send a control signal to said control unit (36) for operation of a booster valve assembly (49, 54) disposed between the servo pressure source (46, 51) and the pressure chamber (13) and between said pressure chamber (13) and a supply container (48), controlling said booster valve assembly (49, 54) by an output from said control unit (36), operating a second travel sensor (40) by said first master brake cylinder piston (12) and electrically connecting an output of said second travel sensor (40) to the control unit (36), arranging said first travel sensor (39) for outputting a electrical signal values that are in a first preselected ratio to displacement travel distance of the pedal rod (2); arranging said second travel sensor (40) for outputting electrical signal values that are in a second preselected ratio to displacement travel distances of said first master brake cylinder piston (12), said first and second preselected ratios to one another in such a way that if the values from both travel sensors (39, 40) are equally large, the displacement travel of the master brake cylinder piston (12) is intentionally longer than an associated displacement travel of the pedal rod (2), and controlling the booster valve assembly (49, 54) via outputs from the control unit (36) as a function of a comparison of the first and second values in such a manner that a value from the first travel sensor that varies upon displacement of the pedal rod (2) leads to an approximation of the part of the value from the second travel sensor (40), to the first value from the first travel sensor (39), via displacement of the master brake cylinder piston (12) by imposition of pressure from the servo pressure source (46, 51) via said booster valve assembly (49, 54).

14. The method as defined by claim 13, which comprises electrically connecting wheel sensors (35) associated with at least said driven wheels to the control unit (36) so that said control unit (36) detects undesirably increasing drive slip, controlling the magnet valve assembly (49, 54) for an automatic hydraulic displacement of the master brake cylinder piston (12), disposing magnet valves (23, 24, 33, 34) between the master brake cylinder (7) and the wheel brake cylinders (25, 26, 29, 30) and operating the magnet valves by said control unit (36) to keep the brake pressure generated by the displacement of the master brake cylinder piston (12) away from the wheel brake cylinders of any wheels not tending to spin.

15. The method as defined by claim 14, which comprises operating a power brake piston (8) relative to and sealed off from a power brake chamber disposed upstream of the pressure chamber (13) between the pedal rod (2) and the piston (10), connecting a second magnet valve assembly (58, 60) to the servo pressure source (46, 51) to connect the power brake chamber (4) with the servo pressure source (46, 51) and to said supply container (48), arranging said control unit (36) to detect a danger of wheel locking on a basis of electrical signals received from the wheel sensors (35) and to block off the power brake chamber (4) relative to the supply container (48) by operation of said second magnet valve assembly (58, 60) and to connect the pressure chamber (13) with the supply container (48) by means of the magnet valve assembly (49, 54) in order to reduced the brake pressure in chamber (13) of the master brake cylinder (7), controlling at least one of the magnet valves (23, 24, 33, 34) in such a way that brake pressure reductions have an effect only in a wheel brake cylinder for a wheel which is tending to lock within a first anti-skid mode stage, and that in a possibly necessary second anti-skid mode stage, apply pressure to the power brake chamber (4) and the power brake piston (8) from the servo pressure source (46, 51) via said second magnet valve assembly to displace the piston rod (10) toward the brake pedal (1), so that for a greater brake pressure reduction, the master brake cylinder (12) can move farther toward a non-braking position.

16. A method of regulating a hydraulic brake system having wheel brake cylinders (25, 26, 29, 30) for braking driven and non-driven wheels (27, 28, 31, 32), a master brake cylinder (7) which supplies the wheel brake cylinders with brake pressures, said master brake cylinder having a housing part (6) and at least one first master brake cylinder piston (12) displaceable in said master cylinder, the method comprising operating a brake pedal (1) and a pedal rod (2) to activate a piston rod (10) movable toward said first master brake cylinder piston (12) for activating said first master brake cylinder piston (12) and a hydraulic brake booster having a pressure chamber (13) in said master cylinder, supplying fluid to said pressure chamber from a servo pressure source (46, 51) by which the master cylinder piston (12) is displaceable and by which said piston rod (10) passes into said pressure chamber (13) in a sealed and displaceable manner for mechanically displacing said first master brake cylinder piston (12), activating a control unit (36), operating a first travel sensor (39) by operating of said brake pedal to send a control signal to said control unit (36) for operation of a booster valve assembly (49, 54) disposed between the servo pressure source (46, 51) and the pressure chamber (13) and between said pressure chamber (13) and a supply container (48), controlling said booster valve assembly (49, 54) by an output from said control unit (36), operating a second travel sensor (40) by said first master brake cylinder piston (12) and electrically connecting an output of said second travel sensor (40) to the control unit (36), arranging said first travel sensor (39) and said second travel sensor (40) for outputting electrical signal values that are substantially proportional to displacement travel distances of the pedal rod (20) and the master brake cylinder piston (12) respectively, converting electrical signal values from at least one of said first and second travel sensors (39, 40) in such a way that if the values to be compared are the same, the displacement travel of the master brake cylinder piston (12) is intentionally longer than that of the pedal rod (2), and controlling the booster valve assembly (49, 54) via the control unit (36) in such a manner that a comparison value from the first travel sensor (39) caused by displacement of the pedal rod (2) leads to an approximation of the comparison value resulting from the second travel sensor (40) by displacement of the master brake cylinder piston (12) by imposition of pressure from the servo pressure source (46, 51) via said booster valve assembly (49, 54).

17. The method as defined by claim 16, which comprises electrically connecting wheel sensors (35) associated with at least said driven wheels to the control unit (36) so that said control unit (36) detects undesirably increasing drive slip, controlling the magnet valve assembly (49, 54) for an automatic hydraulic displacement of the master brake cylinder piston (12), disposing magnet valves (23, 24, 33, 34) between the master brake cylinder (7) and the wheel brake cylinders (25, 26, 29, 30) and operating the magnet valves by said control unit (36) to keep the brake pressure generated by the displacement of the master brake cylinder piston (12) away from the wheel brake cylinders of any wheels not tending to spin.

18. The method as defined by claim 17, which comprises operating a power brake piston (8) relative to and sealed off from a power brake chamber disposed upstream of the pressure chamber (13) between the pedal rod (2) and the piston (10), connecting a second magnet valve assembly (58, 60) to the servo pressure source (46, 51) to connect the power brake chamber (4) with the servo pressure source (46, 51) and to said supply container (48), arranging said control unit (36) to detect a danger of wheel locking on a basis of electrical signals received from the wheel sensors (35) and to block off the power brake chamber (4) relative to the supply container (48) by operation of said second magnet valve assembly (58, 60) and to connect the pressure chamber (13) with the supply container (48) by means of the magnet valve assembly (49, 54) in order to reduced the brake pressure in chamber (13) of the master brake cylinder (7), controlling at least one of the magnet valves (23, 24, 33, 34) in such a way that brake pressure reductions have an effect only in a wheel brake cylinder for a wheel which is tending to lock within a first anti-skid mode stage, and that in a possibly necessary second anti-skid mode stage, apply pressure to the power brake chamber (4) and the power brake piston (8) from the servo pressure source (46, 51) via said second magnet valve assembly to displace the piston rod (10) toward the brake pedal (1), so that for a greater brake pressure reduction, the master brake cylinder (12) can move farther toward a non-braking position.

* * * * *